United States Patent [19]

Tajima

[11] Patent Number: 4,903,043

[45] Date of Patent: Feb. 20, 1990

[54] RECORDING APPARATUS FOR PRINTING ON OPPOSITE SURFACES OF RECORDING MEDIUM

[75] Inventor: Akio Tajima, Tokyo, Japan

[73] Assignee: Seikosha Co., Ltd., Japan

[21] Appl. No.: 124,878

[22] Filed: Nov. 24, 1987

[30] Foreign Application Priority Data

Nov. 26, 1986 [JP] Japan ................................ 61-281590

[51] Int. Cl.$^4$ ................................ G01D 15/24

[52] U.S. Cl. ................................ 346/134; 271/184; 271/185; 271/186; 355/23; 355/24; 355/26; 355/318; 355/319

[58] Field of Search .................... 346/134; 355/24, 23, 355/14 SH, 3 SH, 26, 318, 319; 271/291, 184, 185, 186, 187

[56] References Cited

U.S. PATENT DOCUMENTS

| | | | |
|---|---|---|---|
| 3,988,062 | 10/1976 | Burton et al. | 355/23 |
| 4,019,435 | 4/1977 | Davis | 271/186 |
| 4,027,870 | 6/1977 | Frech et al. | 355/23 |

FOREIGN PATENT DOCUMENTS

| | | | |
|---|---|---|---|
| 0017564 | 1/1984 | Japan | 355/23 |

OTHER PUBLICATIONS

T. Acquairon, "Document Reverter" Xerox Disclosure Journal, vol. 7, No. 1, Jan./Feb. 1982.

Baumann et al., "Duplex Copier" IBM Bulletin pp. 3291–3292, vol. 19, No. 9, 02/77.

*Primary Examiner*—Teresa J. Walberg
*Assistant Examiner*—Huan Tran
*Attorney, Agent, or Firm*—Bruce L. Adams; Van C. Wilks

[57] ABSTRACT

Herein disclosed is a recording apparatus for printing on opposite surfaces of recording medium which comprises: printing means for printing one surface of recording medium in a printing position; a looped conveyor passage for conveying again the recording medium having the printed one surface to the printing position so that another surface may be printed; and turning means disposed in the conveyor passage for turning the opposite surfaces of the once-printed recording medium upside down in a direction perpendicular to the conveying direction thereof with the tops and bottoms being in an identical arrangement.

13 Claims, 2 Drawing Sheets

9

RECORDING APPARATUS FOR PRINTING ON OPPOSITE SURFACES OF RECORDING MEDIUM

BACKGROUND OF THE INVENTION

1. Field of the Invention

The present invention relates to recording apparatus for printing on opposite surfaces of a recording medium.

2. Description of the Prior Art

In the prior art, there is a technique of a so-called "opposite surface copy" for forming images on opposite surfaces of one sheet of a copy paper. According to this technique, the copy paper is fed to a copying unit so that its one surface is copied, and the copy paper is then turned upside down and fed back once more to the copying unit. One of the copy paper feeders for this technique is constructed of: a copy paper reserving unit for reserving uncopies new sheets of copy paper in a stack; a first feeding unit for feeding the copy paper in the copy paper reserving unit sheet to a copying unit; an intermediate tray for receiving from its one side the copy paper which has been fed to the copying unit and had its one surface formed with a copied image and turned upside down, and reserving the same; and a second feeding unit for feeding from said one side of the intermediate tray the sheets of copy paper which have been reserved in the intermediate tray sheet by sheet to the copying unit. In this copy paper feeder, the copy paper having entered the intermediate tray, is pulled out or switched back, when it is to be fed again to the copying unit, in the direction opposite to the entrance direction. As a result, the copy paper has its top and bottom inverted or turned upside down from the position which is taken when it is fed from the copy paper reserving unit to the copying unit, so that it cannot provide an opposite surface copy in which its opposite surfaces have their tops and bottoms arranged in identical positions.

In order to eliminate this drawback, there has been disclosed in Japanese Patent Publication No. 60-44656, for example, a technique in which the intermediate tray in the aforementioned copy paper feeder is divided and turned substantially by 180 degrees about the surfaces of the copy paper stacked in that tray.

This prior art technique of dividing and turning the intermediate tray is disadvantageous because it requires a complicated feed passage for the copy paper which is likely to be jammed or clogged. There arises another problem that the space required for accommodating a unit for dividing and turning the intermediate tray prevents miniaturization of the recording apparatus.

SUMMARY OF THE INVENTION

It is, therefore, an object of the present invention to provide a recording apparatus which can arrange the tops and bottoms of opposite surfaces of a recording medium in identical positions with a simple construction and at low cost.

According to one feature of the present invention, there is provided a recording apparatus for printing on opposite surfaces of a recording medium, which is characterized in that a recording medium turning mechanism for turning upside down a recording medium in a direction perpendicular to the conveying direction thereof is disposed in a looped recording medium conveyor passage in which the recording medium having had its one surface printed in a printing position is conveyed again to the printing position.

More specifically, there is provided a recording apparatus for printing on opposite surfaces of a recording medium comprising: printing means for printing one surface of a recording medium in a printing position; a looped conveyor passage for conveying again the recording medium having the printed one surface to the printing position so that the other surface may be printed; and turning means disposed in the conveyor passage for turning the opposite surfaces of the once-printed recording medium upside down in a direction perpendicular to the conveying direction thereof with the tops and bottoms being in an identical arrangement.

The recording medium turning mechanism disposed in the looped recording medium conveyor passage turns the recording medium upside down in a direction perpendicular to its conveying direction but without any change in the leading end of the recording medium. As a result, both the prints on one and another surfaces are started from the top so that the records of the opposite surfaces have their tops and bottoms arranged in the common direction.

BRIEF DESCRIPTION OF THE DRAWINGS

Other objects, features and advantages of the present invention will become apparent from the following description taken in connection with the embodiment thereof with reference to the accompanying drawings, in which:

FIG. 13 is a perspective view showing the conveying mode of the recording medium to have its opposite surfaces recorded.

DESCRIPTION OF THE PREFERRED EMBODIMENT

Figure 1:
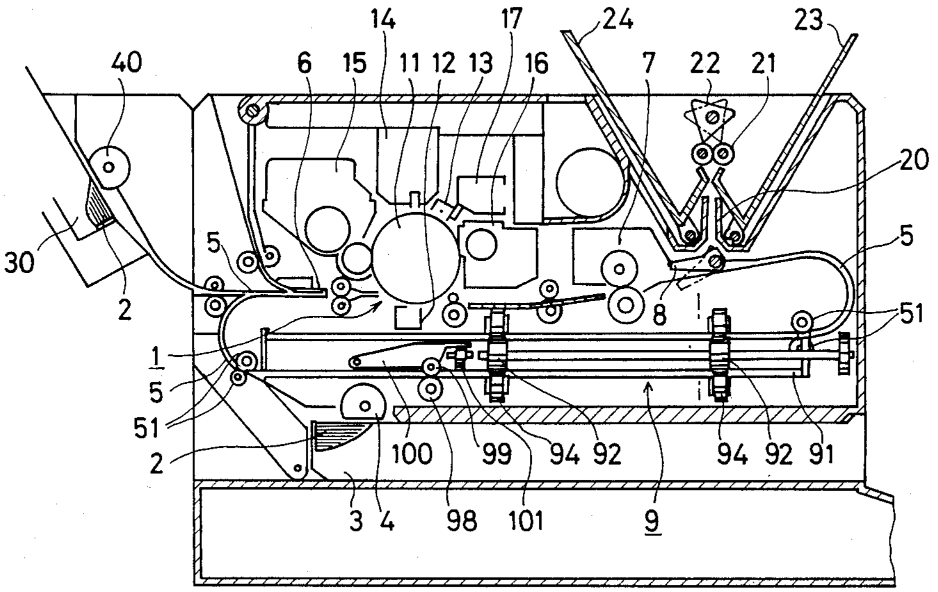
FIG. 1 is a schematic view showing the structure of a recording apparatus according to one embodiment of the present invention.

FIG. 1 shows an embodiment in which a recording paper feeder according to the present invention is applied to a recording apparatus equipped with a recording unit of the electrostatic transfer type. A recording unit 1 records a data stored in a data buffer on a sheet of recording medium in accordance with address signals sent from a central processing unit. This recording unit 1 is equipped with a photosensitive drum 11 and transfer means 12. Around the photosensitive drum 11, there are sequentially arranged a charging unit 13, an electrostatic latent image forming unit 14, a developing unit 15, a cleaning unit 16 positioned downstream of the transfer of an image to a recording medium 2 having passed through the recording unit 1 between the transfer means 12 and the photosensitive drum 11, and a charge eliminating unit 17. Sheets of unprinted recording medium 2 are stacked in a stack in a recording medium tray 3 or 30 so that the uppermost sheet is fed one by one to have its surface recorded by the action of paper feed rollers 4 or 40. The recording medium 2 thus fed is conveyed to a printing station at which is located the recording unit 1 through an upstream section or portion of a looped recording medium conveyor passage 5 including conveyor rollers 51. Just upstream of the recording unit 1, there is arranged a shutter 6 for detecting a leading end of the recording medium 2. In response to a signal produced by the shutter 6, the photosensitive drum 11 is rotated to feed the recording medium 2 into the recording unit 1 so that the developed image on the photosensitive drum 11 is transferred onto the recording medium 2 by the transfer means 12. Downstream of the recording unit 1, there is disposed a fixing unit 7, in which the toner image having been transferred to the recording medium 2 is fixed with heat or under pressure.

The recording medium thus having left the fixing unit 7 while having its one surface A bearing a print is conveyed along a downstream section or portion of the looped conveyor passage 5 in accordance with the position of a run switching lever 8. More specifically, in case the recording medium 2 which has been printed on surface A is to have its opposite surface B subsequently printed, it is fed along the downstream section of the looped recording medium conveyor passage 5 and then to a recording medium turning mechanism 9 in response to the signal because the lever 8 is in the position indicated by solid lines in FIG. 1.

Figure 2:
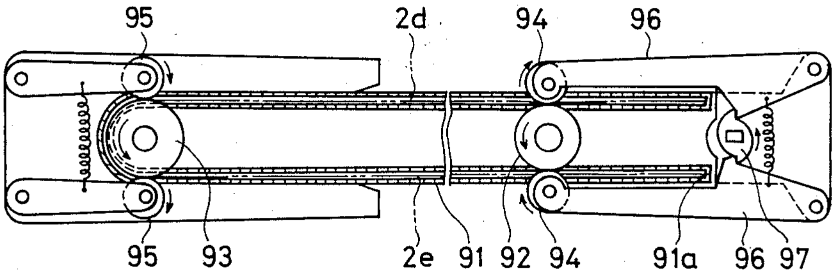
FIG. 2 is an enlarged sectional view taken along line II—II of FIG. 1.

As shown in FIGS. 1 and 2, the recording medium turning mechanism 9 is made operative to turn the recording medium 2 upside down in the direction perpendicular or transverse to the conveying direction of the looped conveyor passage 5 and is constructed for transverse feed rollers 92 and 93 in a U-shaped turning passage 91, and pairs of holding rollers 94 and 95 in elastic contact with the feed rollers 92 and 93. The holding rollers 94 and 94 are rotatably borne on the leading ends of levers 96, which are rocked in accordance with the rotations of a cam 97 to bring the holding rollers 94 into and out of contact with the transverse feed roller 92. More specifically, while the levers 96 are raised by the larger-diameter portion of the cam 97 so that the holding rollers 94 at the leading ends of the levers are apart from the transverse feed rollers 92, the recording medium 2 is fed from the conveyor passage 5 to the upper step or run of the turning passage 91 in the conveying direction, as indicated by recording medium **2*d* in FIG. 2. After this, the levers 96 drop into the smaller-diameter portions of the cam 97 (as indicated by solid lines) so that the holding rollers 94 come into elastic contact with the transverse feed rollers 92. This enables the recording medium 2*d* to be fed in the transverse direction perpendicular to the conveying direction. As a result, the recording medium 2*d* is fed leftwardly in FIG. 2 by the rotations of the feed rollers 92 and 93 and is turned in a U-shape and fed to the lower step or run of the turning passage 91 until it is stopped in the position of recording paper 2*e* abutting against the wall 91*a* of the turning passage. This recording medium 2*e* is turned upside down from the recording medium 2*d* while its top and bottom are in the same positions they were when in the upper step of the turning passage 91**.

In the vicinity of the exit of the recording medium turning mechanism 9, as shown in FIG. 1, there is disposed means for switching the transverse feed of the recording medium to the original feed of the conveying direction. Specifically, a holding roller 99 in elastic contact with a feed roller 98 in the direction of the conveyor passage 5 is rotatably borne on a lever 100, which in turn follows the rotations of an eccentric cam 101 rotating in association with the cam 97. More specifically, when the cam 97 is in the position shown in FIG. 2, the lever 100 is raised by the larger-diameter portion of the eccentric cam 101 so that the holding roller 99 is apart from the feed roller 98. As a result, the recording medium 2 being transversely fed is not blocked from its feed. When the transverse feed is completed so that the levers 96 are raised by the larger-diameter portion of the cam 97, the lever 100 comes into abutment engagement with the smaller-diameter portion of the cam 101 so that the holding roller 99 comes into elastic engagement with the feed roller 98. Thus, the holding rollers 94 and 99, the levers 96 and 100 and so on are synchronized with the cams 97 and 101 to feed the recording medium in the conveying direction and the turning direction. The recording medium **2*e* is fed out to the conveyor passage 5 by the feed roller 98 and the holding roller 99 and is conveyed again to the recording unit 1 by the conveyor rollers 51. Then, the recording medium 2*e* has its other surface B printed at the recording unit 1 and fixed at the fixing unit 7**.

When the recording medium having its opposite surfaces A and B printed reaches the run switching lever 8 through the fixing unit 7, it is discharged upward through a discharge passage 20 and a discharge roller 21 because the run switching lever 8 is then switched to an inclined position, as indicated by chain lines. Above the discharge roller 21, there is arranged a discharge switching lever 22 which can switch the discharge direction of the recording medium to discharged paper trays 23 and 24. More specifically, when the discharge switching lever 22 is in the position indicated by solid lines, the recording medium is discharged to the tray 23 such that its opposite surfaces A and B, A and B, and so on are arranged. When the discharge switching lever 22 is in the position indicated by chain lines, on the contrary, the recording medium is sequentially discharged to the other tray 24 such that its surface A is arranged to face the tray 24. In case, on the other hand, not the opposite surfaces but only one surface A is to be printed, the run switching lever 8 is positioned at first in the position indicated by the chain lines, and the discharge switching lever 22 is positioned in the positioned indicated by the chain lines. Then, the recording medium having had only its one surface A printed is sequentially discharged with its surface A facing the tray 24.

Figure 3:
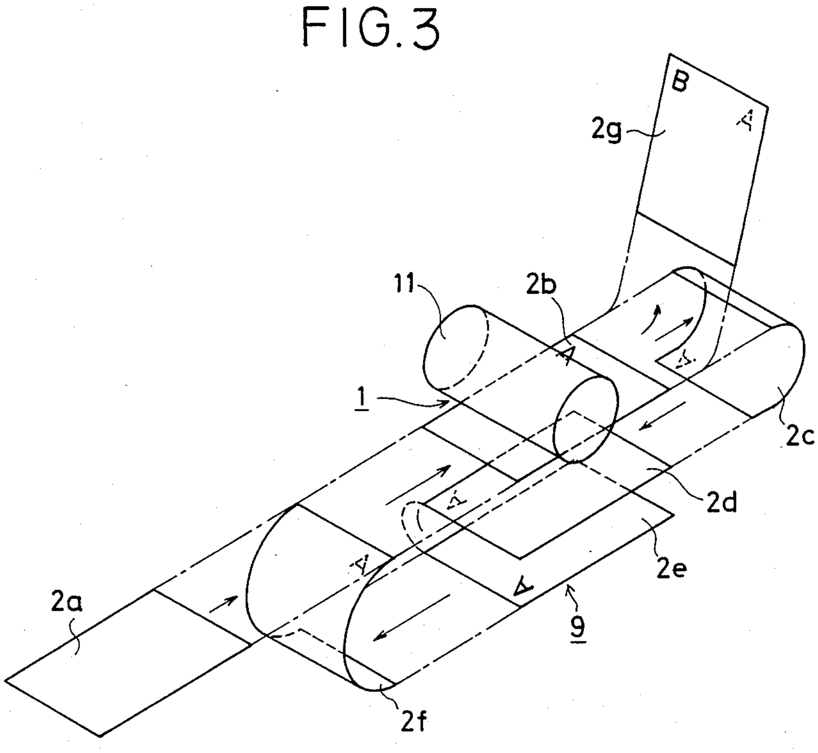

The conveying operations when the opposite surfaces of the recording medium 2 are to be printed are illustrated in FIG. 3. Specifically, the recording medium **2*a* fed out to the conveyor passage 5 from the recording medium tray 3 or 30 is printed (to the recording medium 2*b*) on its one surface A in the recording unit 1 and is turned upside down (to the recording medium 2*c*) in the conveying direction in the conveyor passage 5 until it is fed into the recording medium turning mechanism 9. The recording medium 2*d* positioned in the upper step of the U-shaped turning passage 91 is turned upside down with its printed surface A facing downward but its top and bottom ends (i.e., it leading and trailing ends) unchanged as they are. Stated otherwise, the recording medium 2 is turned upside-down without inverting or reversing the top and bottom ends thereof. The recording medium 2*e*, which is positioned in the lower step of the turning passage 91 as a result that the recording medium turning mechanism 9 has operated to feed the recording medium 2*d* in the direction perpendicular to the conveying or advancing direction of the recording medium, has its printed surface A directed upward and turned upside down with respect to the recording medium 2*d* but with its top and bottom being unchanged as they are. The recording medium 2*f*, which has been fed out from the recording medium turning mechanism 9 and turned upside down during passing through the conveyor passage 5, has its printed one surface A directed downward and its unprinted other surface B directed upward, when it is fed again to the recording unit 1, but with its top and bottom remaining as they are. Then, the surface B is printed, and the recording medium 2g having its opposite surfaces printed is discharge to the discharge tray 23 or 24**.

In the recording medium turning mechanism 9 according to the embodiment thus far described, both the feed rollers and the holding rollers are used for feeding the recording medium in the direction perpendicular to the conveying direction. Despite this fact, however, a variety of modifications can be made, including means for pushing the side end surface of the recording medium by a wall or lever, for feeding the recording medium by a special form belt or rubber lever, or for feeding the recording medium by clamping it at its outer sides by belts. Moreover, the direction of the U-turn may be inverted upward. Still moreover, the printing timing may be modified in various manners such as to print the surface A of a second sheet while the first sheet is being turned upside down.

As has been described hereinbefore, according to the present invention, the recording medium is turned upside down in the direction perpendicular to the conveying or advancing direction by the recording medium turning mechanism so that both its sides can be recorded with its tops and bottoms arranged in the same positions. Owing to the simple construction, it is possible to realize a thinner structure and an overall miniaturization, and a reduction of the manufacturing cost. Moreover, the stability of the feeding operation of the recording medium can be improved.

What is claimed is:

1. A recording apparatus for printing on opposite surfaces of a recording medium comprising:

printing means for printing on one surface of a recording medium when the recording medium is conveyed to a printing position;

means including a looped conveyor passage for conveying in a conveying direction the recording medium having a printed one surface to said printing position so that the opposite surface of the recording medium may be printed;

turning means disposed in said conveyor passage for turning the opposite surface of the once-printed recording medium upside down ,in a transverse direction perpendicular to the conveying direction thereof with the tops and bottoms of both surfaces of the recording medium being in an identical arrangement; and switching means disposed in the vicinity of said turning means for switching the feed of said recording medium from the transverse direction to the original conveying direction, the switching means comprising a feed roller for feeding the recording medium in the conveying direction, a holding roller mounted to make elastic contact with said feed roller, a pivotable lever having said holding roller rotatably mounted thereon and pivotable in one direction to move said holding roller out of contact with said feed roller and pivotable in an opposite direction to move said holding roller into elastic contact with said feed roller, and an eccentric cam for pivotally actuating said lever.

2. A recording apparatus for printing on opposite surfaces of recording medium according to claim 1, wherein said turning means includes transverse feed rollers, and holding rollers in elastic contact with said feed rollers.

3. A recording apparatus for printing on opposite surfaces of a recording medium comprising: conveying means having an upstream conveying section for conveying a recording medium in an advancing direction to a printing station to enable printing on one surface of the recording medium and having a downstream conveying section for conveying the once-printed recording medium in the advancing direction to a turning station to enable turning upside-down of the once-printed recording medium; printing means operable when the recording medium is at the printing station for printing on one surface of the recording medium; turning means operable when the once-printed recording medium is at the turning station for turning the recording medium in a direction transverse to the advancing direction to turn the recording medium upside down without inverting the leading and trailing ends thereof, the turning means including first feeding means actuatable to a first position to enable the recording medium to be delivered to and discharged from the turning station and actuatable to a second position for feeding the recording medium through the turning station, and first camming means for actuating the first feeding means to the first and second positions; and transporting means for transporting the upside-down recording medium from the turning station to the upstream conveying section for conveyance to the printing station to enable printing on the other surface of the recording medium, the transporting means including second feeding means actuatable to a first position to enable the upside-down recording medium discharged from the turning station to be delivered to the transporting means and actuatable to a second position for feeding the upside-down recording medium to the upstream conveying section, and second camming means for actuating the second feeding means to the first and second positions in synchronism with the first camming means such that the first feeding means is in its first position when the second feeding means is in its second position and the first feeding means is in its second position when the second feeding means is in its first position.

4. A recording apparatus according to claim 3; including means disposed along the downstream conveying section and upstream of the turning station for effecting the discharge of a printed recording medium from the recording apparatus.

5. A recording apparatus according to claim 3; wherein the turning means comprises a turning passage having upper and lower runs interconnected by a curved run, one of the upper and lower runs being positioned to receive the once-printed recording medium conveyed by the downstream conveying section and the other of the upper and lower runs being positioned to deliver the upside-down recording medium to the upstream conveying section, and the first feeding means includes means for feeding the recording medium in the transverse direction from the one run through the curved run to the other run to thereby turn the recording medium upside down.

6. A recording apparatus according to claim 5; wherein the means for feeding comprises a set of rotationally driven feed rolles, and holding rollers resiliently biased toward the feed rollers and coacting therewith to feed the recording medium therebetween in response to rotation of the feed rollers.

7. A recording apparatus according to claim 6; including means mounting the holding rollers for displacement toward and away from the feed rollers to enable the recording medium to be interposed therebetween, and the first camming means comprises a rotationally driven cam for effecting displacement of the holding rollers.

8. A recording apparatus according to claim 7; wherein the means mounting the holding rollers comprises levers pivotally mounted at one end thereof and rotatably supporting the holding rollers at another end thereof, and the means for effecting displacement comprises cam means in camming engagement with the levers for pivotally displacing the levers to thereby displace the holding rollers.

9. A recording apparatus according to claim 6; wherein the set of feed rollers is disposed between the upper and lower runs and effects feeding of the recording medium in both the upper and lower runs.

10. A recording apparatus according to claim 9; wherein the cam for displacing the holding roller comprises a rotary eccentric cam.

11. A recording apparatus according to claim 3; wherein the second feeding means comprises a rotationally driven feed roller, and a holding roller resiliently biased toward the feed roller and coacting therewith to feed the upside-down recording medium therebetween in the advancing direction to the upstream conveying section in response to rotation of the feed roller, and the second camming means comprises a rotationally driven cam for displacing the holding roller toward and away from the feed roller to enable the upside-down recording medium to be interposed therebetween.

12. A recording apparatus according to claim 3; wherein the conveying means includes a looped conveyor passage having an upstream section along which the recording medium is conveyed to the printing station and a downstream section along which the once-printed recording medium is conveyed to the turning station and the upside-down recording medium is conveyed to the upstream section.

13. A recording apparatus according to claim 12; including at least one feeding means for feeding a recording medium to be printed to the upstream section of the looped conveyor passage.

* * * * *